(12) United States Patent
Nolan et al.

(10) Patent No.: US 6,252,514 B1
(45) Date of Patent: Jun. 26, 2001

(54) HOT-SWAP ASSEMBLY FOR COMPUTERS

(75) Inventors: Shari J. Nolan, San Jose; Richard N. Hibbs, Palo Alto; Ian C. Fry, Danville; Jeffery S. Nespor, Pleasanton; Jerome Parker Lane, San Jose, all of CA (US)

(73) Assignee: Convergent Technologies, Inc., San Jose, CA (US)

( * ) Notice: Subject to any disclaimer, the term of this patent is extended or adjusted under 35 U.S.C. 154(b) by 0 days.

(21) Appl. No.: 09/326,913

(22) Filed: Jun. 7, 1999

(51) Int. Cl.⁷ .................................................. G08B 21/00
(52) U.S. Cl. .................. 340/686.4; 70/277; 361/170; 361/685
(58) Field of Search .............................. 340/686.4, 542, 340/568.1; 361/170, 683, 684, 685, 686, 752, 753, 754, 756, 759; 70/277; 439/153, 152, 159, 160; 312/223.2

(56) References Cited

U.S. PATENT DOCUMENTS

| | | |
|---|---|---|
| 4,656,848 | 4/1987 | Rose .......................................... 70/58 |
| 4,925,397 | 5/1990 | Mirand et al. ........................ 439/353 |
| 5,442,513 | 8/1995 | Lo ........................................ 361/685 |
| 5,483,419 | * 1/1996 | Kaczeus, Sr. et al. ............... 361/685 |
| 5,509,731 | 4/1996 | Callahan et al. ..................... 312/9.22 |
| 5,557,499 | * 9/1996 | Reiter et al. .......................... 361/685 |
| 5,600,539 | 2/1997 | Heys, Jr. et al. ..................... 361/684 |
| 5,692,208 | * 11/1997 | Felcman et al. ................. 361/683 X |
| 5,751,551 | * 5/1998 | Hileman et al. ..................... 361/753 |
| 5,791,753 | * 8/1998 | Paquin .............................. 312/332.1 |
| 5,831,821 | * 11/1998 | Scholder et al. ..................... 361/686 |
| 5,857,364 | 1/1999 | Hsu et al. .............................. 70/120 |
| 5,914,855 | * 6/1999 | Gustafson et al. ................... 361/685 |

* cited by examiner

*Primary Examiner*—Thomas Mullen
(74) *Attorney, Agent, or Firm*—Mark A. Haynes; Haynes & Beffel LLP

(57) ABSTRACT

An assembly that engages a component to a computer system includes a cover adapted to retain the component and to be inserted within a chassis of the computer system. A slide movably coupled to the cover has a proximal position associated with inserting the cover into the chassis and a distal position associated with withdrawing the cover from the chassis. A detector coupled to a lock and to the slide detects movement of the slide to actuate the lock. The lock is coupled to the slide and to the detector, and blocks movement of the slide towards the distal point when the lock is in an engaged state.

67 Claims, 15 Drawing Sheets

HOT-SWAP ASSEMBLY FOR COMPUTERS

BACKGROUND OF THE INVENTION

1. Field of the Invention

The present invention relates to mechanical and electrical apparatus for connecting and disconnecting components of a computer system. More particularly, the present invention relates to such connecting and disconnecting components while the computer system is operating.

2. Description of Related Art

Computer systems such as file servers and storage servers in computer networks are relied upon by large numbers of users. When a file server or storage server is out of operation, many people are inconvenienced. Thus, technology has been developed which supports maintenance and service of computer systems while they remain operational. One part of maintenance and service includes the replacement of components. So-called hot swap technology allows the replacement of components without turning off the power or resetting the computer system as a whole.

Typical hot swap technology employs resources for signaling the system and components in the system about an intention to remove or replace a component. Also, the technology includes routines that stabilize communications among the components, and manage the distribution of power to components during the exchange.

The exchange of components on computer systems for maintenance and repair requires human operators. Human operators are prone to misuse or abuse the mechanical and electrical resources associated with hot swap technology. For example, an operator may attempt to withdraw a component from a computer chassis without first executing hot swap electrical routines to prepare the component. Also, with components that require significant force for engagement and disengagement, human operators may damage delicate parts of system while applying the force for engagement or disengagement.

Therefore, is desirable to provide a mechanism that reduces the possibility of misuse or abuse by human operators of mechanisms for engaging and disengaging components, and mechanisms for managing the electrical hot swap processes.

SUMMARY OF THE INVENTION

The present invention provides a mechanism that prevents premature disengagement of components of the computer system, and reduces the mechanical force needed to be applied by operators for the engagement and disengagement of components. Thus, an operator expects to apply a relatively light force to remove or insert a component on the computer system. The light force applied minimizes the chance of mechanical damage to the system. Also, the mechanism is able to block attempted removal of a component if the electrical processes necessary for hot swap have yet to complete. The combination results in a substantially more reliable system, less prone to damage during the hot swap operation.

According one aspect of the invention, a module is provided for computer system. The computer system includes a chassis having one or more slots for accepting the module. Processing resources associated with removing and inserting modules during operation are included in the computer system. The module according to the present invention comprises a cover adapted to fit within the slot in the chassis. A system component, such as a controller circuit board, disk drive array, or other data-processing resource is mounted with the cover. A connector coupled to the component includes a plurality of connection elements adapted to mate with corresponding elements in the computer system on the chassis. Means for preventing mishandling, such as those described in more detail below, are included. Such means include mechanical and electrical components which provide leverage for engaging and disengaging the component, and which communicate with the host system to prepare for electrical disengagement and engagement of the component. Also, such means include a lock or other mechanism for preventing the mechanical disengagement of a component when the system has yet to electrically prepare for the disengagement.

According to one embodiment of the invention, a mechanism for providing leverage for engagement and disengagement of the component in the cover is included. The mechanism includes a slide mounted on the cover. A pivotal connection is provided near a distal end of the slide. The proximal end of the slide is adapted to extend outside the cover, and act as a handle for an operator. The lever system is coupled to and actuated by movement of the slide. The lever system provides for balanced engagement of the component with the connectors in the host system.

In one preferred embodiment, the slide is movable among an inserted position, at least one intermediate position and an extended position. The lever system translates movement of the slide in the direction from the intermediate position to the extended position into force causing disengagement of the connector, and translates movement of the slide in the direction from the extended position to the intermediate position into force for engagement of the connector. A portion of the motion from the inserted position toward the intermediate position provides a dead region, in which no force is translated from the slide through the lever system to tend to disengage the component. This dead region is utilized for sensing motion, to enable electronic lock to prevent further disengagement if the system has not prepared for it.

In another preferred embodiment a lock is included which prevents motion of the slide from being translated to disengagement force. The lock is coupled to the host system, and engages the slide when the host system has not finished preparing for the disengagement. In one preferred system, power is normally not applied to the lock. In this embodiment, the lock includes a mechanical stop which prevents motion until the operator applies an enabling act, such as depressing a spring loaded tongue element. When the enabling act is executed, power is applied to the lock. Unless the system signals that it is ready for disengagement, the lock prevents further disengagement action.

The lever system in a preferred embodiment comprises first and second lever arms coupled to a pivotal connection near the distal end of the slide. The first lever arm extends toward a first lateral edge of the cover. The first lever arm is coupled to a fulcrum near the first lateral edge. The opposite end of the lever arm is coupled to an engagement member adapted to engage with a mechanical stop on the chassis. The second lever arm extends to the second lateral edge of the cover. The second lever arm is coupled to a fulcrum near the second lateral edge. The opposite end of the second lever arm is coupled to a second engagement member. For balanced operation, the first and second lever arms are essentially the same length and apply substantially equal force in response to motion of the slide. The engagement member in this embodiment is connected near the lateral ends of the respective lever arm. The engagement member is biased via a spring to swing outward to engage a mechanical stop on the chassis. During engagement, the spring tends to force the engagement member to extend outside the cover and engage the mechanical stop. The lever arm acts to apply an engagement force against the mechanical stop. During disengagement, the lever arm acts to reverse the engagement force. Also first and second retraction arms are coupled respectively with the first and second lever arms. A retraction arm is coupled to the engagement member and to a pivotal connection on the slide, such as the same pivotal connection to which the lever arm is connected. The retraction arm acts in response to motion of the slide towards the retracted position to pull against the force of the spring and withdraw the engagement member inside the cover to allow removal of the component.

In yet another embodiment, the host system includes a graphical user interface or other interface allowing an operator to signal the system of an intention to remove a component. In response to the operator signal, the host system performs power management and communication management routines to prepare the system for a hot swap operation. Until the power and communication management routines have been completed, the lock associated with the component to be removed is set in a position to prevent removal.

The present invention provides mechanical and electrical components which improve the reliability of systems with hot swap capability, and make such operations more easily executed.

Further aspects and advantages of the present invention can be seen upon review of the figures, the detailed description, and the claims which follow.

DETAILED DESCRIPTION

Figure 1:
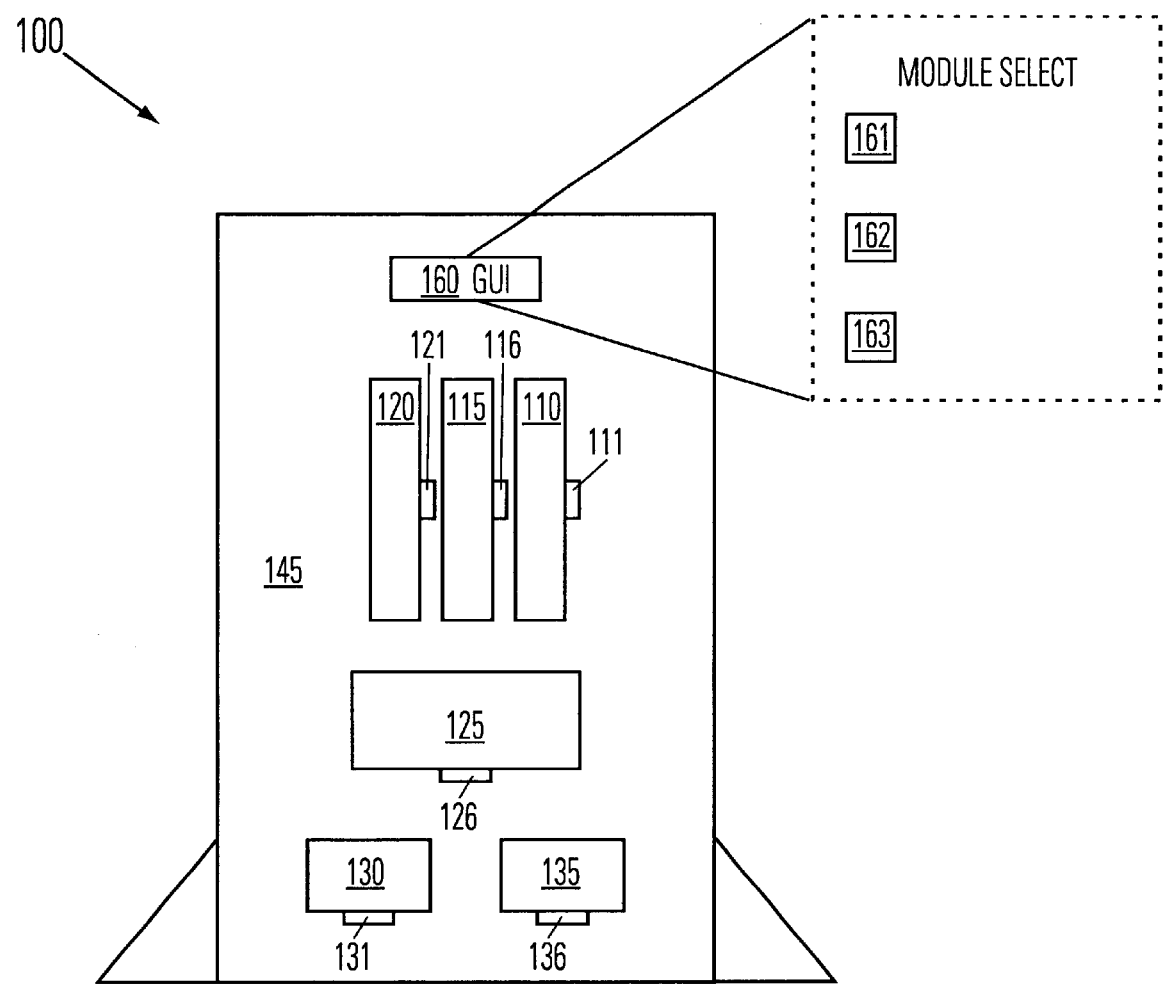
FIG. 1 is a front view of a computer system employing the concepts of this invention.

A detailed description of embodiments of the present invention is provided with reference to the figures, in which FIG. 1 shows a computer system chassis 100 having a plurality of modules and a graphic user interface 160 according to the present invention. The computer system chassis 100 has a face 145 through which components are added to and communicate with the host processing system in the chassis 100. The components are engaged to communicate with the host processor through a corresponding slot or opening in the face 145 of the chassis 100. The data processing resources in a preferred system provide storage services for a network of computers. In such preferred system, the components include memory modules, such as large arrays of flash EPROMs or disk drives storing large amounts of information. In addition, network interface components are included supporting a network architecture to provide memory services to many users. The host system in the chassis 100 further includes processing resources associated with removing and inserting modules during operation of the host.

The components are mounted in covers that are removably mounted on the chassis 100 through the slots in the face 145. Such components include controller circuit boards, disk drives, memory circuit boards and other devices having resources for communicating with the host system. In the simplified example shown in FIG. 1, modules 110, 115 and 120 are arranged vertically in the face 145. The modules 110, 115 and 120 each include handles 111, 116, 121, and respective covers as shown in more detail in FIG. 2. The handles 111, 116, 121 are engaged with a mechanism on the respective cover for locking the component within the chassis 100 when the host system is operational. For applications having connectors with large numbers of I/O pins, a handle is coupled with a mechanism providing leverage for insertion force.

As represented schematically in FIG. 1, other modules 125, 130, 135 are shown in the face 145. These modules are formed in alternative configurations, such as in a horizontal alignment relative to the chassis 100. Such alternative modules may include disk drive arrays or other types of components designed for operation with the host system. In the example shown the additional modules 125, 130 and 135 include handles 126, 131 and 136 adapted for coupling with a locking mechanism and an assembly for translating motion of the handle into insertion and removal force for the component.

Also shown in FIG. 1 is a graphic user interface GUI 160. The GUI 160 provides an interface for operator of the device. The interface is monitored by control processes in the host system for managing hot swap operations. Thus, the GUI includes a module select window having graphical buttons 161, 162 and 163 by which users are able to select modules and functions related to such modules for execution by the processes in the host system. Thus logic within the host system is coupled to the interface for managing the preparation of communication systems and power management resources for removal and insertion of components. In one embodiment, the GUI 160 also acts to signal the operator when the component is ready for removal, and the host system is no longer overriding the lock mechanism on the component.

The modules, such as module 110 of the system include a component mounted within a cover. The cover includes structure for securing a connector for connection of the component to the system communication structure, and a mechanism for engaging and disengaging the module with the system chassis. Also a mechanical lock is included with the cover which is engaged to prevent removal of the module unless the system has released the lock. FIGS. 2–7 illustrate one embodiment of the cover. FIGS. 8–11 illustrate an alternative embodiment of the cover. Both embodiments include means for engaging and disengaging the a module according to the present invention. The illustrated means constitute preferred embodiments of the present invention. Other mechanisms based on a lever system, and an engagement member coupled to the lever system are also suitable alternatives. Also, a lock mechanism is provided for preventing operation of the lever system under system control.

Figure 2:
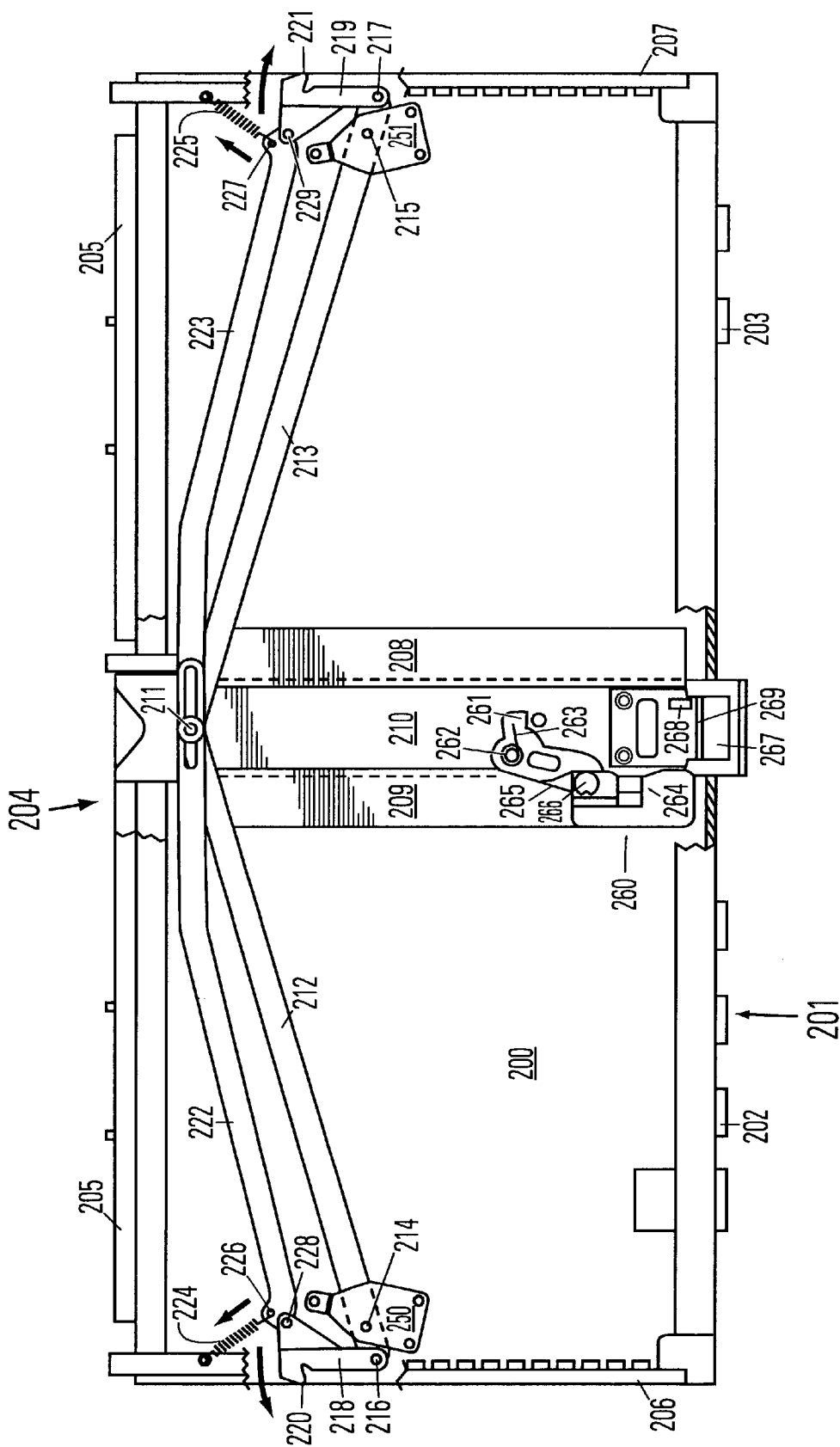
FIG. 2 is a top view of a cover under this invention showing a slide in an inserted position.
Figure 3:
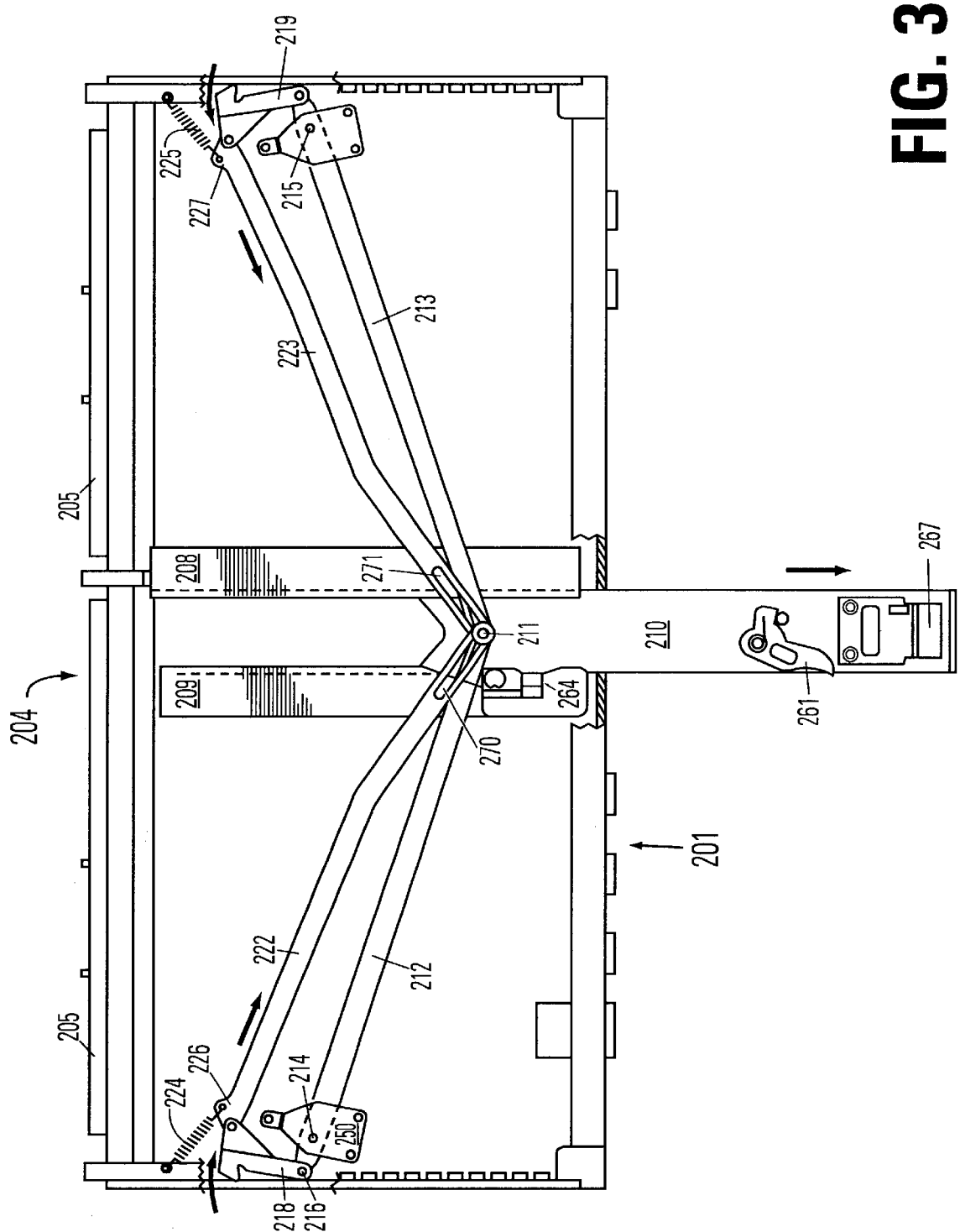
FIG. 3 is a top view of the cover of FIG. 2 with the slide in the extended position.

FIG. 2 illustrates one embodiment of a cover 200 according to the present invention. The cover 200 includes a front face 201 which includes a variety of structures (e.g. 202, 203) which provide openings for switches, connectors and indicators intended to be visible through the cover. The cover 200 includes a back face 204 against which an array 205 of connectors is mounted for establishing electrical communication with the host system bus. The cover includes a left side wall 206 and a right side wall 207. The cover 200 includes a base plate on which guides 208 and 209 are mounted. A slide 210 is positioned between the guides 208 and 209, and is moveable between an inserted position as illustrated in FIG. 2, an intermediate position, and a withdrawn position as illustrated in FIG. 3.

A pivot 211 is mounted on the slide 210. The pivot 211 is constructed using a riser secured to the slide 210 and extending upward from the plane of the drawing. The pivot 211 is adapted to receive a first lever arm 212 and a second lever arm 213. The first lever arm 212 extends from the pivot 211 through a fulcrum 214 near the left side 206 of the cover. Opposite the fulcrum 214, a second end 216 of the first lever arm 212 is connected to an engagement member 218. The engagement member 218 includes a hook 220 adapted to engage a mechanical stop (not shown) on the chassis. In a similar fashion, the lever arm 213 extends through a fulcrum 215 on the right lateral side 207 of the cover. A second end 217 of the lever arm 213 is coupled to an engagement member 219. The engagement member 219 includes a hook 221 adapted to engage a second mechanical stop (not shown) on the chassis.

Structural plates 250 and 251 secure the fulcrums 214 and 215 for the lever system. The lever system illustrated in FIG. 2 provides gain in force between 10 to 1 and 20 to 1. This gain is important for engagement of covers and components that include large arrays of connectors 205, such as hundreds of connectors, which require engagement force on the orders of tens to hundreds of pounds. Other lever systems are suitable for use as well. Also in some systems which require less engagement force, the mechanical gain is not as important.

The use of the first and a second lever arms 212, 213 provides for essentially balanced operation of the engagement members 218, 219.

Although not shown in FIGS. 2 and 3, the first lever arm 212 and second lever arm 213 have elongated openings near the pivot 211 which allow for sliding engagement with the pivot 211.

As can be seen, operation of the slide 210 causes the lever arms 212 and 213 to rotate on the respective fulcrums 214, 215. In the inserted position as shown in FIG. 2, the engagement members 218 and 219 are pulled toward the front face 201 of the cover under an engagement force caused by the lever action. As the slide 210 is withdrawn from the cover, the engagement members 218 and 219 are pushed away from the front face 201, allowing disengagement of the hooks 220, 221 from a chassis.

Retraction arms 222 on the left side and 223 on the right side are also coupled to the pivot 211. These retraction arms could be coupled to other pivot points associated with the slide 210 if desired. The retraction arm 222 is coupled to a spring 224 which tends to pull the lateral end 226 of the retraction arm 222 toward the back face 204 of the cover. The lateral end 226 of the retraction arm 222 is coupled to the engagement member 218 at a pivot 228. The spring 224 through this connection tends to rotate the engagement member 218 in a counter-clockwise direction out of the side 206 of the cover in order to engage the chassis.

The retraction arm 223 extends to the right side engagement member 219, and is coupled to a spring 225 at a lateral end 227. Also, the lateral end 227 is connected to a pivot 229 on the engagement member 219. The action of the spring 225, connected in this manner, tends to drive the engagement member 219 in a clockwise direction out the side 207 of the cover.

The system shown in FIG. 2 also includes a lock mechanism 260 generally coupled with the slide 210. The lock mechanism includes a pawl 261 mounted on a pivot 262 coupled to the slide 210. A spring 263 tends to cause the pawl 261 to rotate in a counter-clockwise direction. A mechanical stop 264 is mounted on the cover 200 adjacent the slide 210. The rail 209 includes an angular surface 265 against which the pawl 261 tends to rotate as the slide 210 is withdrawn. A solenoid 266 is mounted above the pawl 261. The solenoid 266 includes a pin not shown which is normally in a withdrawn position. When the pin is withdrawn, the pawl will rotate outward and engage the mechanical stop 264 to prevent withdrawal of the slide 210. If the solenoid 266 is engaged, the pin will extend downward, and prevent the pawl 261 from rotating outward to engage the stop 264. Thus, when the pin is extended, the slide 210 will be freely withdrawn past the lock mechanism, and allow disengagement action of the lever arms and retraction arms as described above. Otherwise, the lock will act to prevent disengagement of the cover until the pin on the solenoid 266 is extended.

The lock also includes a spring loaded tongue element 267, or other element requiring an operator action to begin the withdrawal process. A switch 268 is coupled with the tongue element 267. The tongue element 267 includes a ridge 269 which tends to engage a bar on the cover, or the chassis, and prevent motion of the slide 210. When an operator the presses the tongue element 267, the ridge 269 is lowered below the bar on the cover and the switch 268 is engaged. The switch 268 enables the solenoid 266. A signal provided by the host system controls the solenoid 266 so that it remains in the withdrawn position unless the system is ready for withdrawal of the component on the cover. If the system is ready for withdrawal, the solenoid 266 extends the pin downward and allows withdrawal of the slide 210.

As the slide 210 is withdrawn from the fully inserted position as shown in FIG. 2 to the intermediate position at which the pawl 261 engages the mechanical stop 264, there is essentially no disengagement force applied to the engagement members 218, 219 because of the sliding engagement of the lever arms 212, 213 with the pivot 211, and the relatively small distance traversed by the slide. Furthermore, because little force is needed to cause motion of the slide, the operator will not tend to pull too hard and damage the system. The motion from the fully inserted position to the intermediate position allows for detection of the attempted withdrawal of the component, and prevention of that withdrawal if the system has not prepared for it.

FIG. 3 illustrates the cover and lever assembly of FIG. 2 with the slide 210 in the withdrawn position. In this position, the lever arms 212, 213 pivot around the respective fulcrums 214, 215 and cause the engagement members 218, 219 to be pushed away from the front face 201 to release the engagement force. The retraction arms 222, 223 are extended to the end of the slots 270, 271 at the ends near the pivot 211. This pulls against the springs 224, 225 and causes the engagement member 218 to rotate in a clockwise direction, and the engagement member 219 to rotate in a counter-clockwise direction, withdrawing engagement members away from the chassis, and allowing the cover 200 to be removed from the chassis.

As a module is inserted, the action of the retraction arms 222 and 223 tends to allow the engagement members 218, 219 to rotate outward and engage the chassis. The action of the lever arms 212,213 applies engagement force against the chassis to secure the connectors 205 with corresponding connectors in the chassis.

Figure 4:
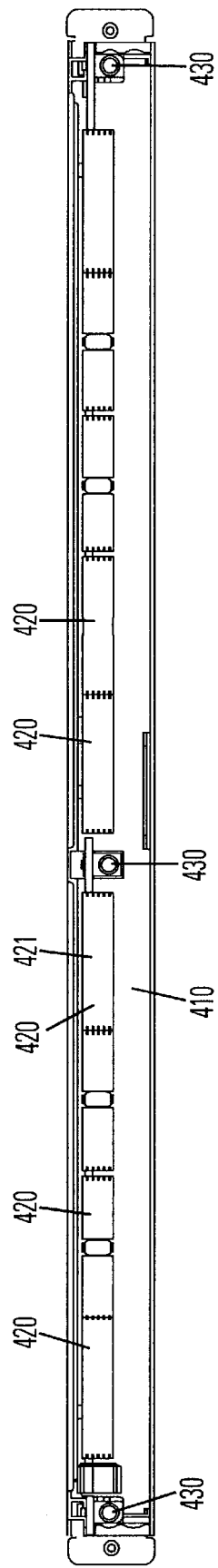
FIG. 4 is a back view of the cover in FIG. 2.

FIG. 4 is a view of the back end 204 of the cover 200 showing a component connector 420 used to couple a memory module with the computer system 100. The component connector 420 is mounted on the cover 200, or alternatively formed for example on a circuit board in the cover, as an extension of the mounted component. The cover 200 provides a back panel 410 through which the component connector 420 extends to engage with the corresponding mating connector (not shown) of the computer system 100. The component connector 420 may have either male or female connector elements. The individual pins are not shown in FIG. 4, to avoid crowding in the drawing.

In one example, the component comprises a memory module including a large pin connector, such as ones suitable for employment with arrays of FLASH EPROM modules that store many gigabytes of information. FIG. 4 illustrates an embodiment incorporating a large male or female pin connector on the cover 200, where the pins/holes are arranged in clusters 421, including four or more rows of pins. The large pin connector 420 may include over 1500 pins/holes and several ground and power contacts which engage a mating connector within the chassis. For large pin connectors such as one illustrated by FIG. 4, a force greater than 200 pounds may be necessary to engage the memory module with the computer system 100.

Multiple guide pins 430 are also incorporated into the component connector 420, or in the back panel 410, to guide the component connector into engagement with the mating connector of the chassis. In this example, three guide pins 430 are spaced horizontally to extend from the back end 204 of the cover 200. The guide pins may be positioned on either the back panel 410 or on an interface surface of the component connector. The guide pins 430 align the component connector 420 with respect to the slot or opening of the chassis when an insertion force is applied to the cover 200. In particular, large pin connectors used with the component connector 420 benefit from guide pins 430 because the guide pins more readily ensure alignment between the memory module and the computer system when the insertion force is applied to the component connector.

Figure 5A:
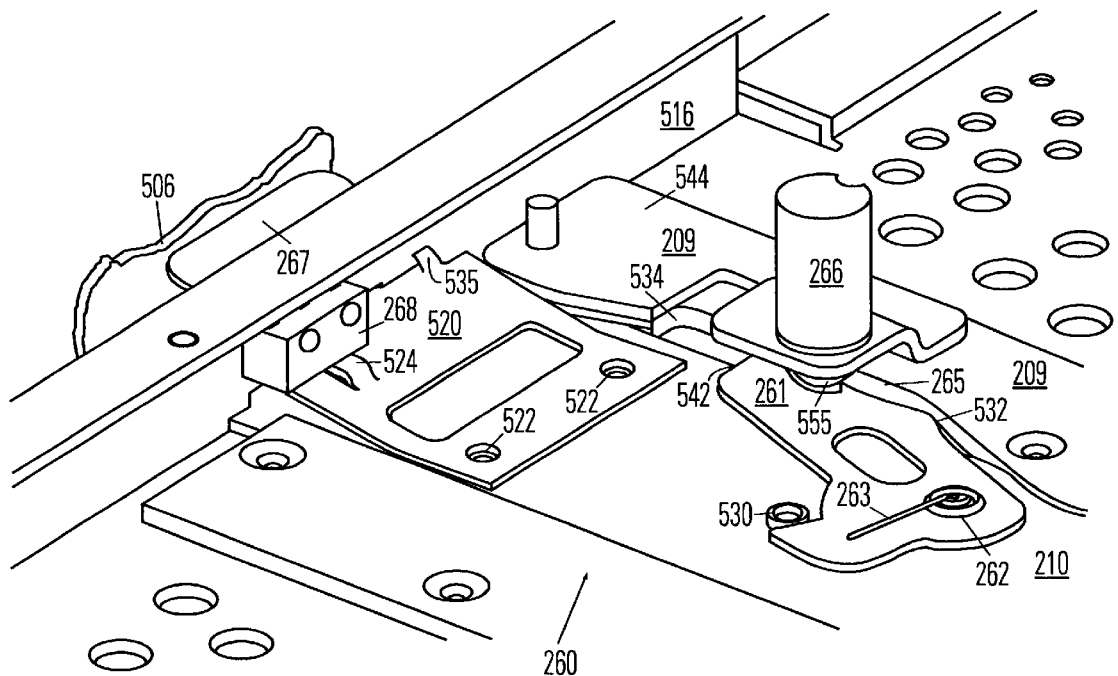
FIG. 5A is an isometric close-up of an interior portion of the cover showing a lock and the slide in a first stage.
Figure 5B:
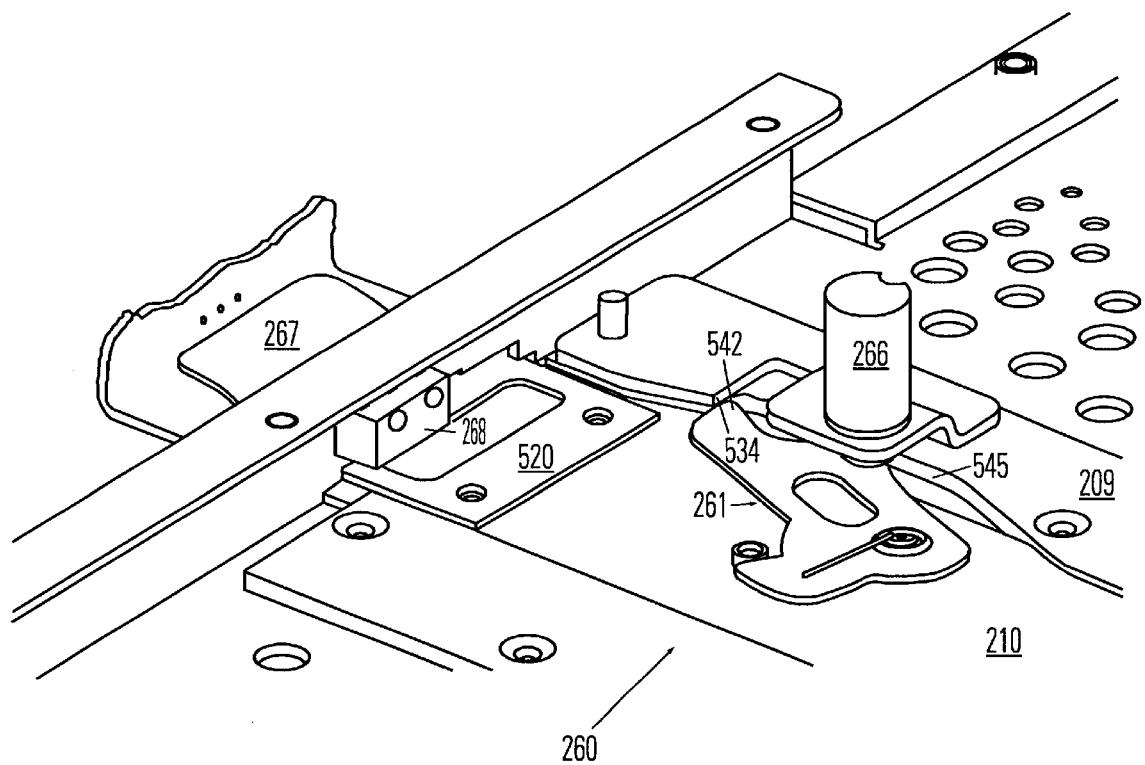
FIG. 5B is an isometric close-up of the interior portion of the cover showing the lock and the slide in a second stage.
Figure 5C:
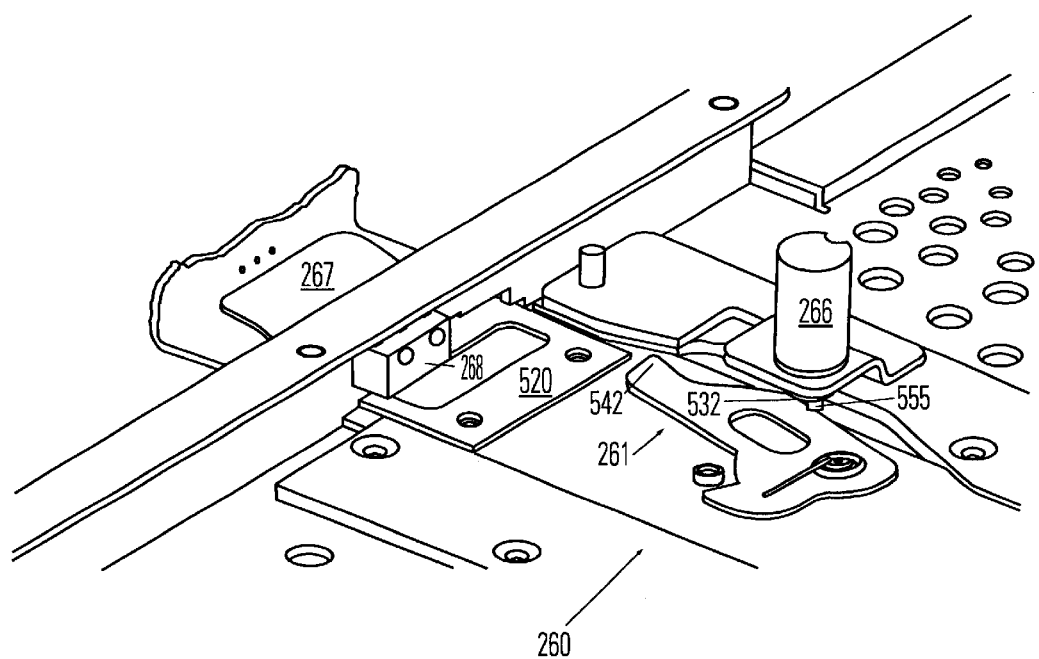
FIG. 5C is an isometric close-up of the interior portion of the cover showing the lock and the slide in a third stage.

FIGS. 5A–5C provide a close-up illustration of the lock mechanisms 260 on the slide 210. First with reference to FIG. 5A, the slide 210 is in a fully inserted position. The tongue element 267 tends by its spring action to lift away from the slide 210. A ridge 535 engages a bar 516 on the front face of the cover and prevents withdrawal of the slide. The pawl 261 is shown in a position such that the solenoid 266 may engage a pin 555 with the pawl 261 by extending downward. A stop 530 positions the pawl 261 in the manner shown to let the pin extend past the top surface of the pawl so that a side 532 of the pawl will ride along the pin. If the pin is not extended, then the side 532 of the pawl will ride adjacent the guide member 209 in the region 265 as described before.

The proximal end 506 of the slide 210 is formed to provide a handle for the operator. The mechanical stop 264 is reinforced with structural members 544 and 534.

The tongue element 267 is secured to the slide 210 by elements 522 which may be screws, welded joints or other structural connectors. The tongue element has a region 520 which is normally inside the wall 516. The ridge 535 is formed in the region 520. Also, a switch contact 524 is formed on the tongue element 267 in the region 520. The switch contact 524 is adapted to contact a switch 268 mounted on the bar 516 on the cover. When the contact 524 is spaced away from the switch 268, the system enables the solenoid 266 as mentioned before.

FIG. 5B illustrates the lock 260 with the pawl 261 engaged at the mechanical stop 264. Skis occurs if the pin 555, shown in FIG. 5A is withdrawn from the solenoid to 266, allowing the surface 532 of the pawl 261 to ride along the wall in region 545 of the guide 209. In order to reach this position, the tongue element 267 must be depressed, causing the ridge 535 to slip under the bar 516, and the contact 524 to lose contact with the switch 268.

FIG. 5C illustrates the lock mechanism 260 in substantially the same position as that of FIG. 5B, except that the solenoid 266 is engaged to prevent the pawl 261 from engaging the mechanical stop. Thus, the slide is in a position to be withdrawn from the cover. It can be seen in FIG. 5C that the pin 555 of the solenoid 266 is extended downward, and the surface 532 of the pawl rides on the pin 555 to prevent engagement with the mechanical stop 264.

The lock mechanism shown in FIGS. 5A–5C is characterized by a solenoid 266 which has a normally extended pin 555. In this manner, when the power is off for the system, the pin is extended, and the slide may be withdrawn. Thus, a lock which allows withdrawal of the system when power is off is an advantageous aspect of the invention.

Other configurations of locks can be utilized, including solenoid having normally withdrawn pins, other electromagnetically actuated components, or other electromechanical configurations which allow for system control of the lock during hot swap operations.

Figure 6A:
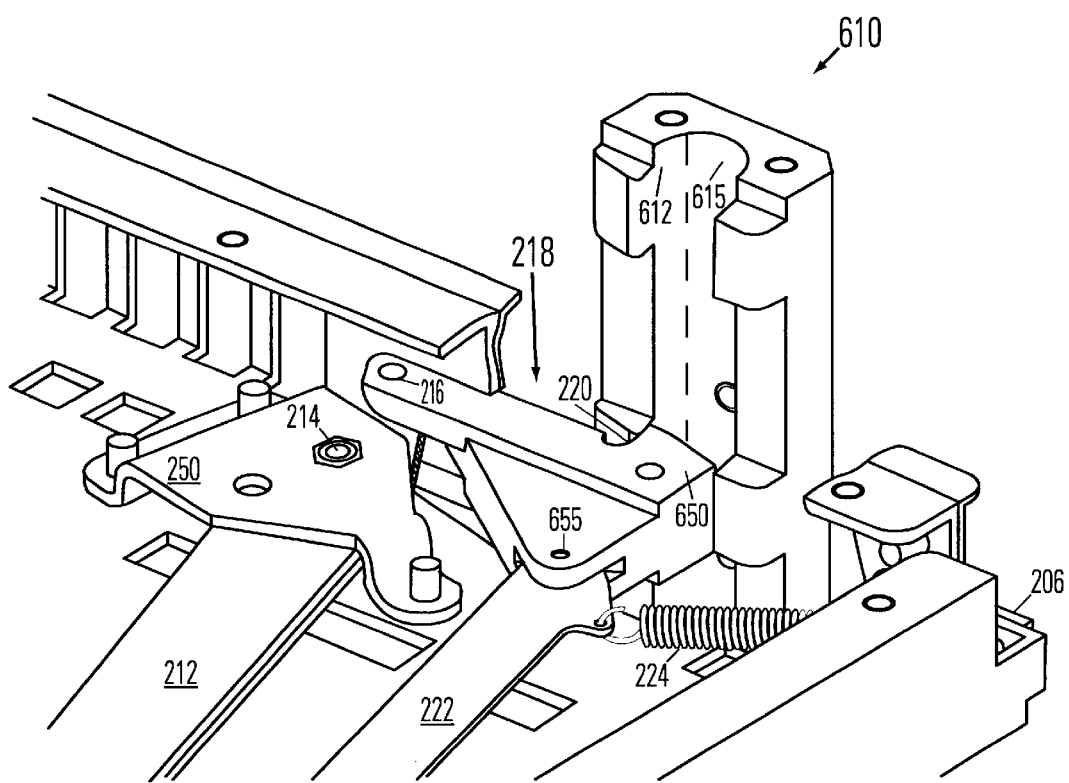
FIG. 6A is an isometric close up of an interior portion of the cover showing an assembly of components for inserting the cover into a chassis, the assembly of components being in the first stage.
Figure 6B:
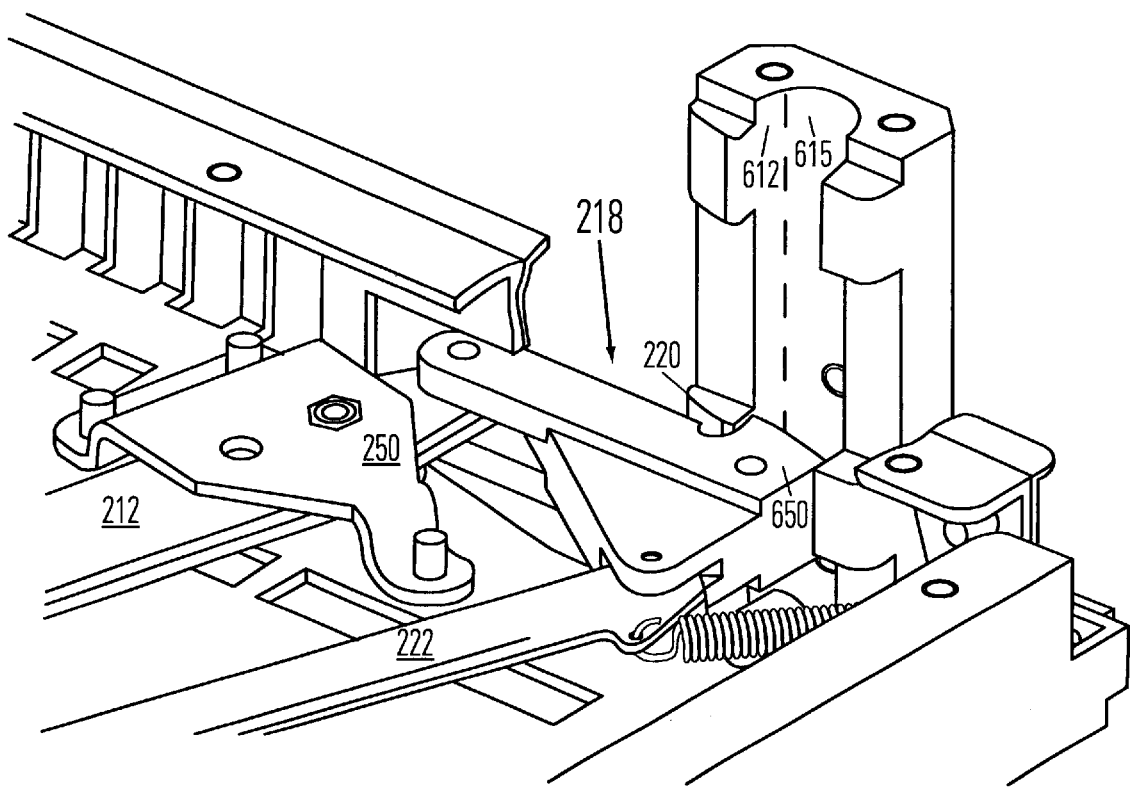
FIG. 6B is an isometric close up of an interior portion of the cover showing an assembly of components for inserting the cover into the chassis being in the second stage, the assembly of components being in the second stage.
Figure 6C:
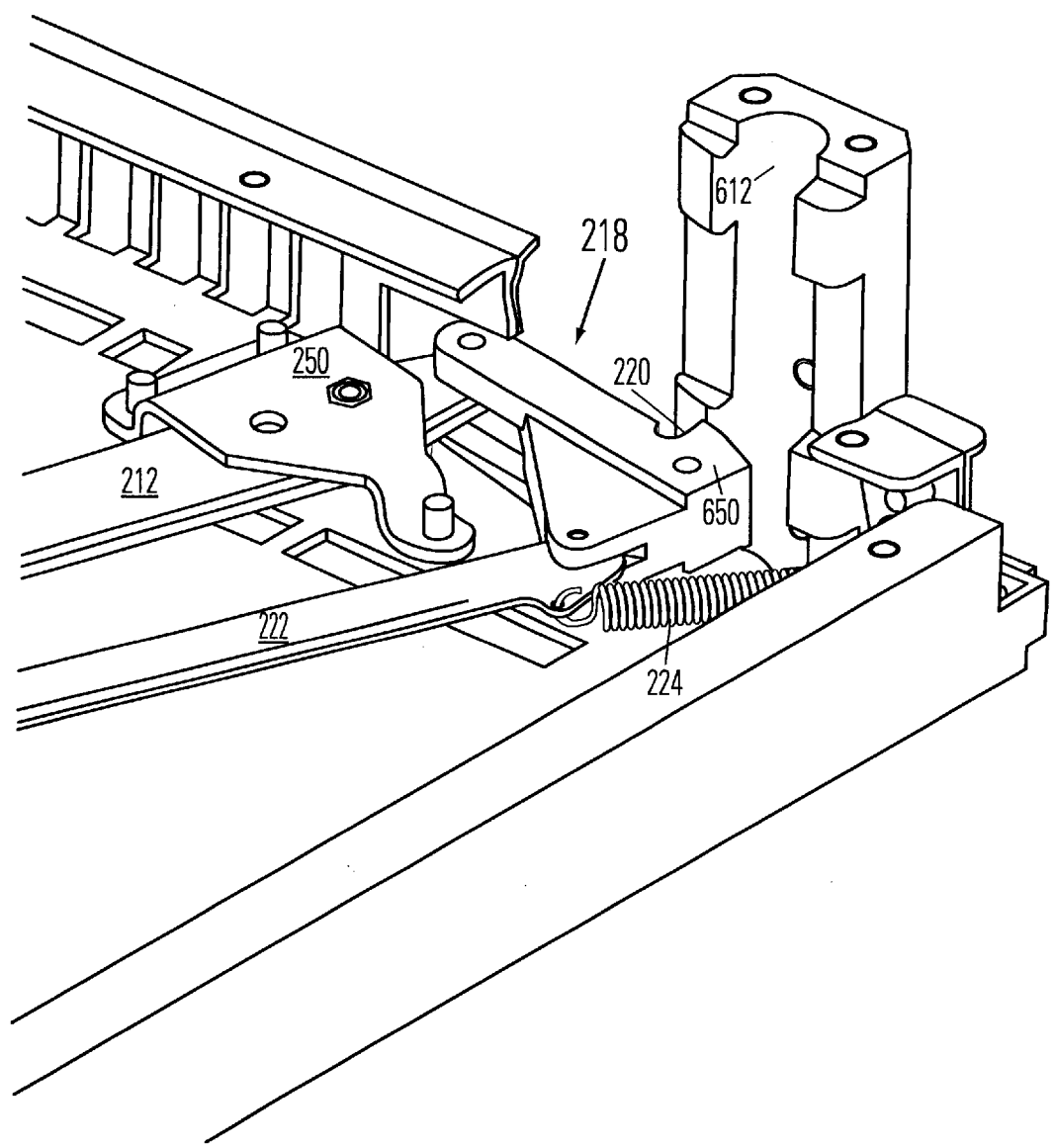
FIG. 6C is an isometric close up of an interior portion of the cover showing an assembly of components for inserting the cover into the chassis being in the third stage, the assembly of components being in the third stage.

FIGS. 6A–6C illustrate the engagement member 218 in engaged and disengaged positions. As can be seen in FIG. 6A, the lever arm 212 is secured through a fulcrum 214 to the engagement member 218 at pivot 216. The fulcrum 214 is secured to the cover by structure 250. The retraction arm 222 is secured to the engagement member 218 at pivot 655. The spring 224 is coupled between the retraction arm 222 and the cover. As shown in the drawing, the engagement member has a hook region 220 which is engaged with a mechanical structure 610 on the chassis. Structure 610 includes a surface 612 within a cut out area 615, against which the hook 220 applies engagement force. The head 650 of the engagement member 218 fits within the cut out area 615 of the member 610. This member is engaged along the left side 206 of the cover in the example shown. In FIG. 6B, the lever arm 212 has been moved to the intermediate position against the stop on the tongue member. In this illustration can be seen that the head 650 of the engagement member 218 remains within the cut out area 615, and little or no disengagement force is applied. In FIG. 6C the lever arm 212 is moved toward the fully retracted position, releasing the head 650 of the engagement member 218, so that the hook 220 does not engage the member 612. The retraction arm 222 pulls against spring 224 to withdraw the head 650 from the member 610 allowing reaction of the component.

The engagement member and lever system illustrated can be replaced with a variety of other mechanisms, including mechanically operated and magnetically operated engagement devices. The present system allows for significant leverage action to apply insertion force for large connector components, using smooth, easy action withdrawing and inserting the slide.

Figure 7:
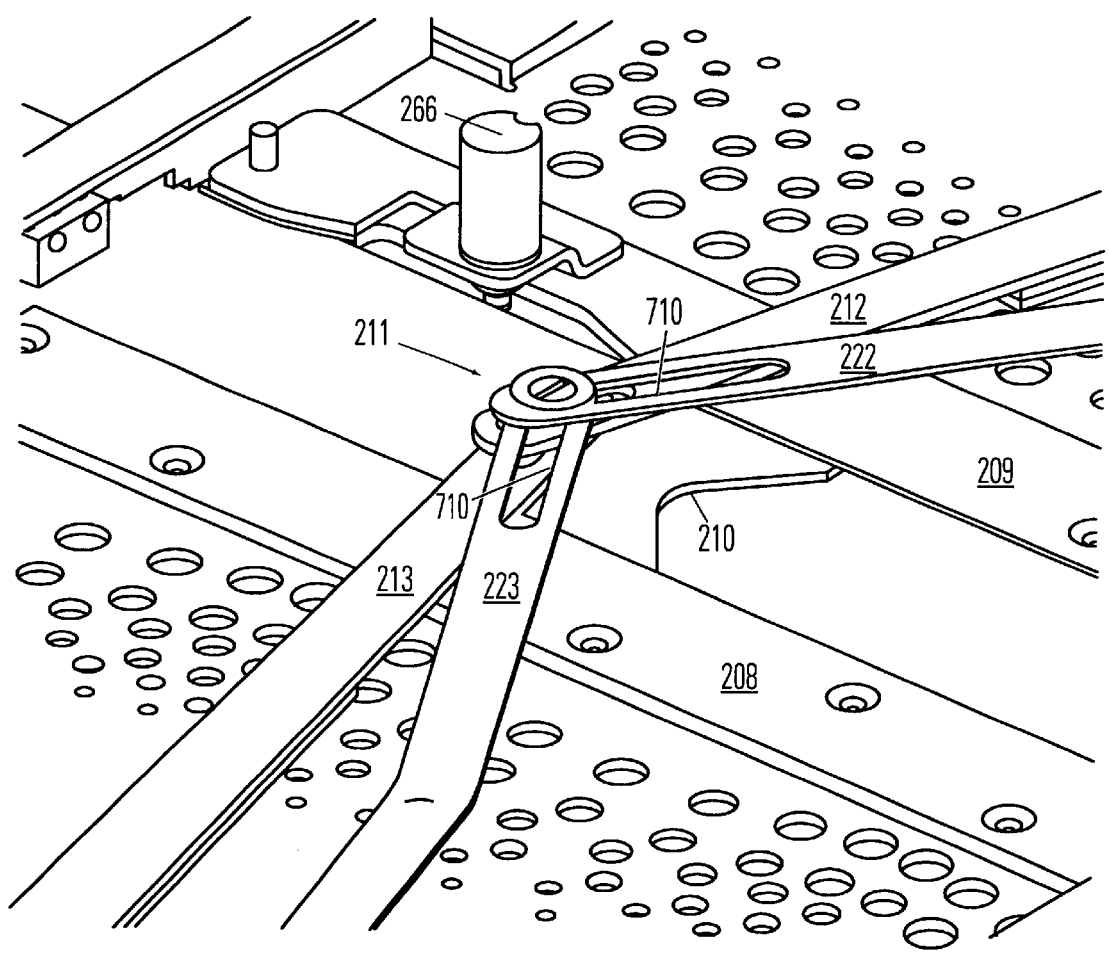
FIG. 7 is an isometric close-up of a pivot connection used with an embodiment of this invention.

FIG. 7 illustrates the pivot 211 on the slide 210, and the manner in which the lever arms 212 and 213 and the retraction arms 222 and 223 are engaged with the pivot 211. In FIG. 7, the slide is in the withdrawn position, such that the distal end of the slide is adjacent the solenoid 266. The retraction arms 223 and 222 include slots 710. When the slide 210 is in the withdrawn position as shown in FIG. 7, with the distal end of the slide near the solenoid 266, the pivot 211 engages the ends of the slots 710, and applies force to withdraw the engagement member inside the cover as described above.

The lever arms 212 and 213 also include slots which couple with the pivot 211. The slots allow for the linear slide to drive arcuate motion of the lever arms, and for movement of the slide from the fully inserted position to the intermediate position without applying significant lever force to the engagement members.

FIGS. 8, 9, 10, and 11 illustrate an alternative configuration of the lever assembly and mechanical lock for a module cover 800 according to the present invention, adapted for systems which require lower engagement and disengagement forces than are developed using the configuration of FIGS. 2 and 3. The cover 800 includes a front wall 801 and a back wall 802. A left side wall 803 and a right side wall 804 are formed on the cover 800. The chassis includes mechanical stop structures 805 and 806 on the left and right sides, respectively, of the slot in the chassis which receives the cover 800.

The mechanism includes a slide structure 810 which has a left extending arm 811 and a right extending arm 812. The left end of the left extending arm 811 includes a guide surface 813 which is adapted to slide along a receiving surface 815 on the left side wall 803. The end of the right extending arm includes a guide surface 814 which is adapted to slide along a receiving surface 816 on the right side wall 804. Also, the slide 810 is secured by a riser 820 within a slot 821. The slot 821 establishes the maximum inserted position and the maximum withdrawn position of the slide 810. Although not shown in the drawing, a spring loaded switch, like the tongue assembly 267 of FIGS. 2 and 3, and in FIGS. 5A–5C, is mounted by fasteners at the fastener receiving holes 822 on the slide. A mechanical lock including a pawl 823 is also mounted on the slide 810 in the manner discussed above with respect to FIGS. 5A–5C. The pawl 823 is adapted to strike a stop member 824 on the cover 800 unless a solenoid pin is extended to drive the pawl to a position which avoids contact with the stop 824, as described above. This structure is placed in a different location on the slide 810 than the similar structure describes above with respect to FIGS. 5A–5C. The mechanical lock can be positioned at any convenient location on the slide as suits the need of the particular embodiment, and adopt a variety of mechanical and electromechanical structures.

The slide includes a handle structure 850 at the proximal end of the slide.

The distal end of the slide 850 is adapted to extend long enough to hold the pawl 823 and improve structural integrity during sliding from inserted to withdrawn positions of the slide 810.

The assembly includes a left lever arm 830 and a right lever arm 831. The left lever arm 830 is coupled to a fulcrum 832. The right lever arm 831 is coupled with fulcrum 833. The lever arms 830, 831 include respective inside curved surfaces 834 and 835. Likewise, the lever arms 830, 831 include respective outside curved surfaces 836 and 837. In the inside curved surfaces 834 and 835 are adapted to engage with pivot 838 and bar 840 on the left, and a pivot 839 and bar 841 on the right. The outside curved surfaces 836 and 837 are adapted to engage with pivots 842 and 843 on the left and right sides respectively. The left lever arm 830 includes an engagement end 844 adapted to apply engagement force against the stop 805 in the chassis. The right lever arm 831 includes an engagement end 845 adapted to fit with the stop 806 in the chassis.

Figure 8:
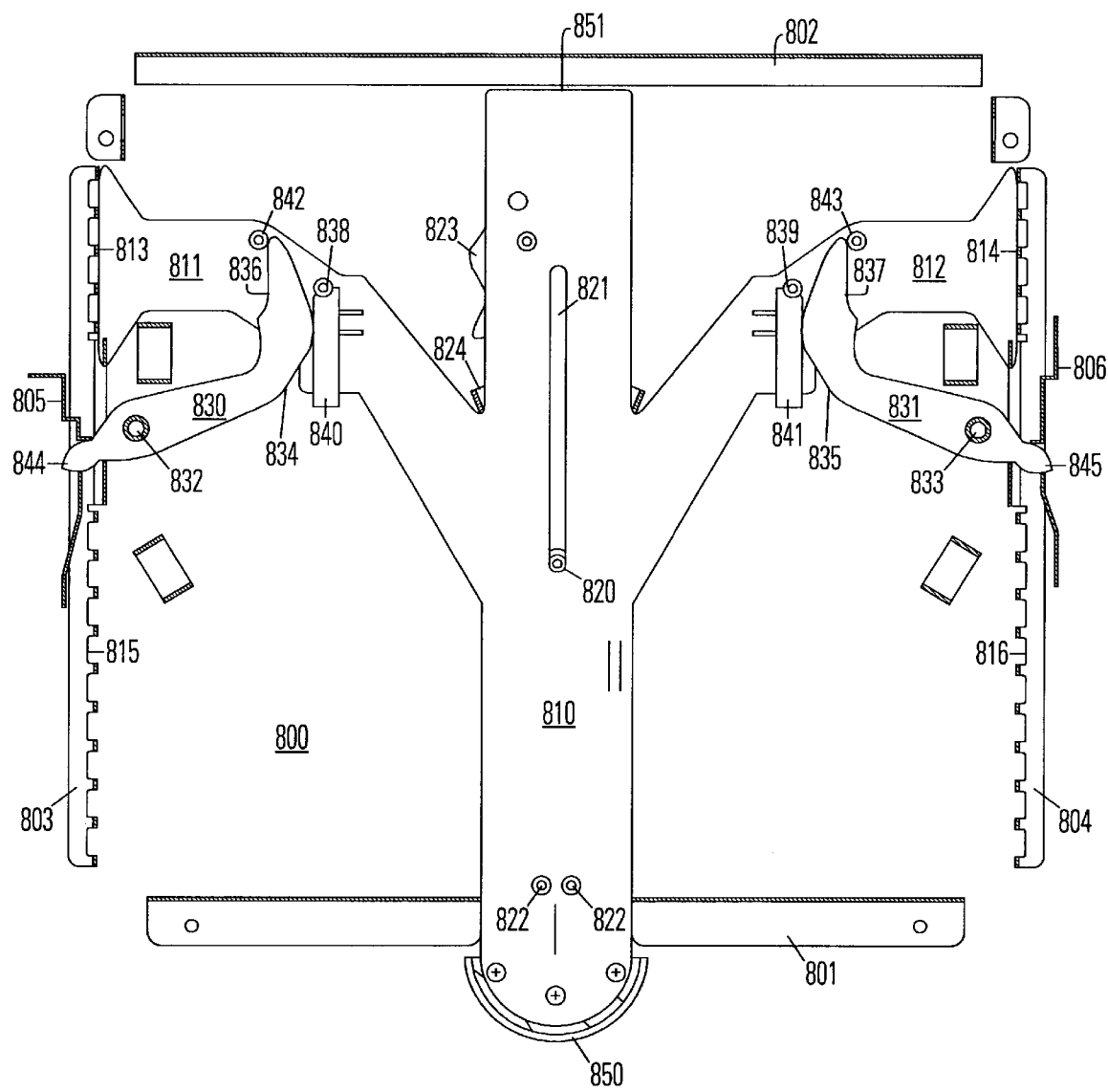
FIG. 8 is a plan view of alternative embodiment of a module cover according to the present invention, the slide being in a fully inserted position.
Figure 9:
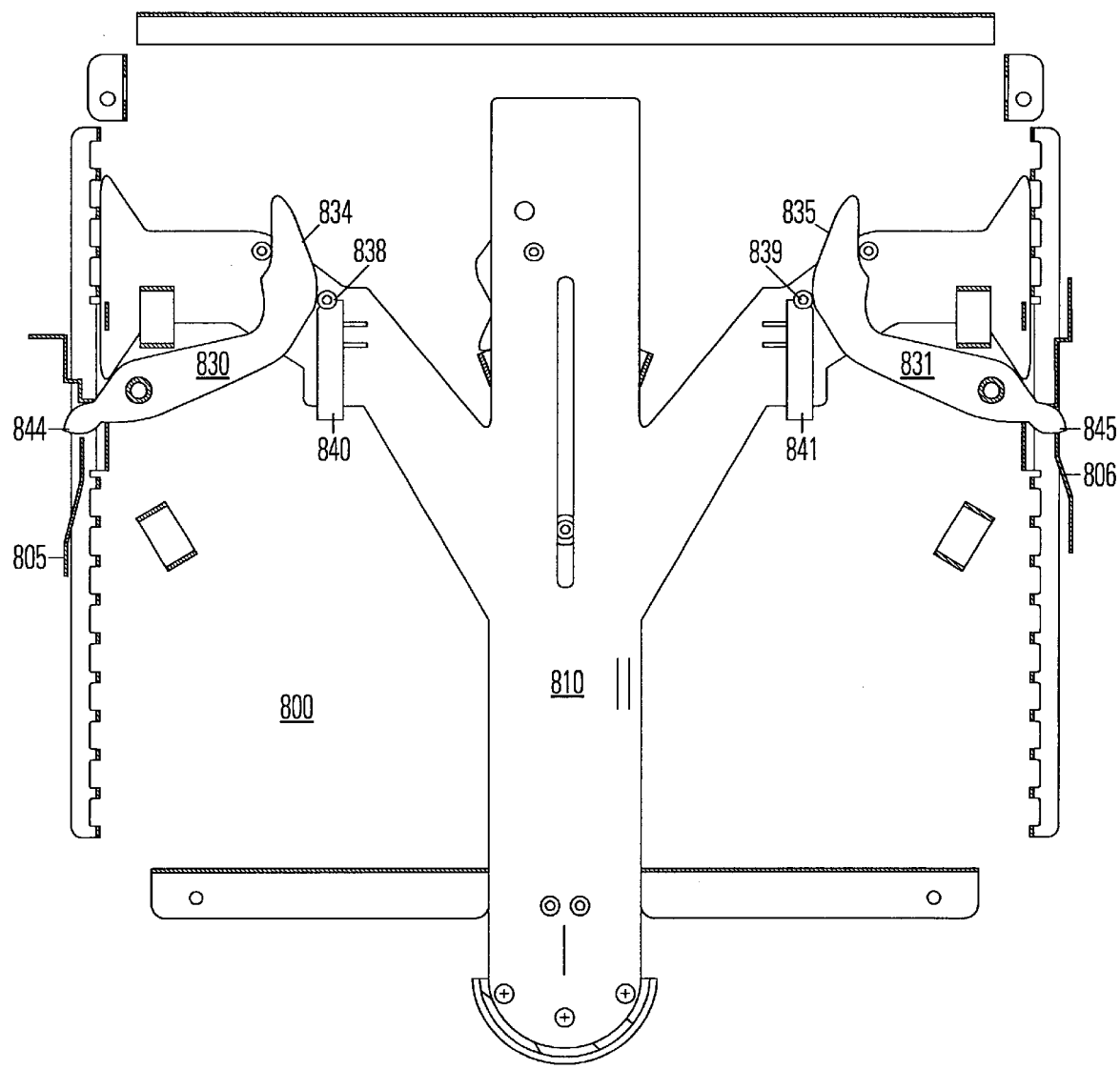
FIG. 9 is a plan view of the embodiment of FIG. 8, the slide being in a first intermediate position.
Figure 10:
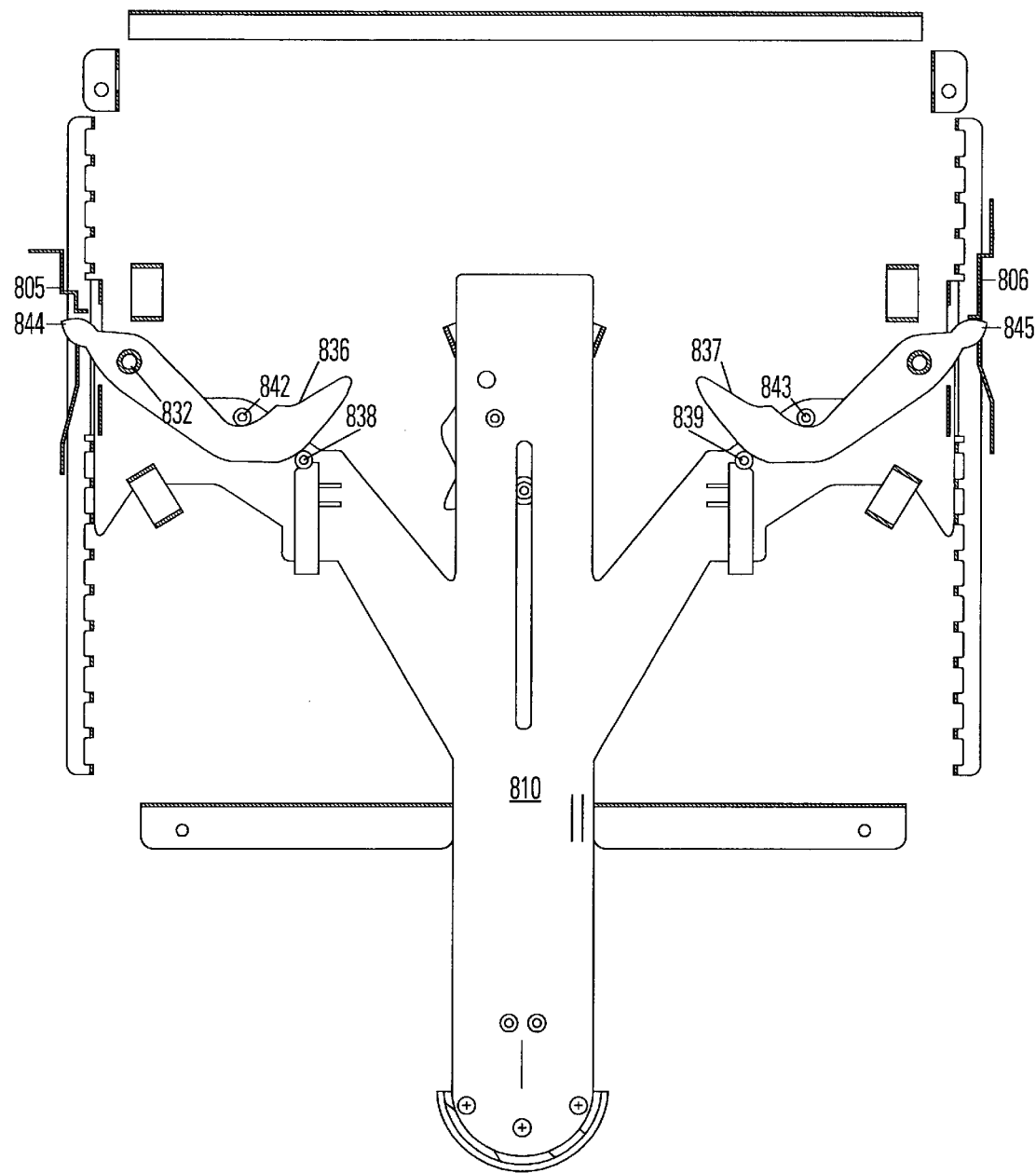
FIG. 10 is a plan view of the embodiment of FIG. 8, the slide being in a second intermediate position.
Figure 11:
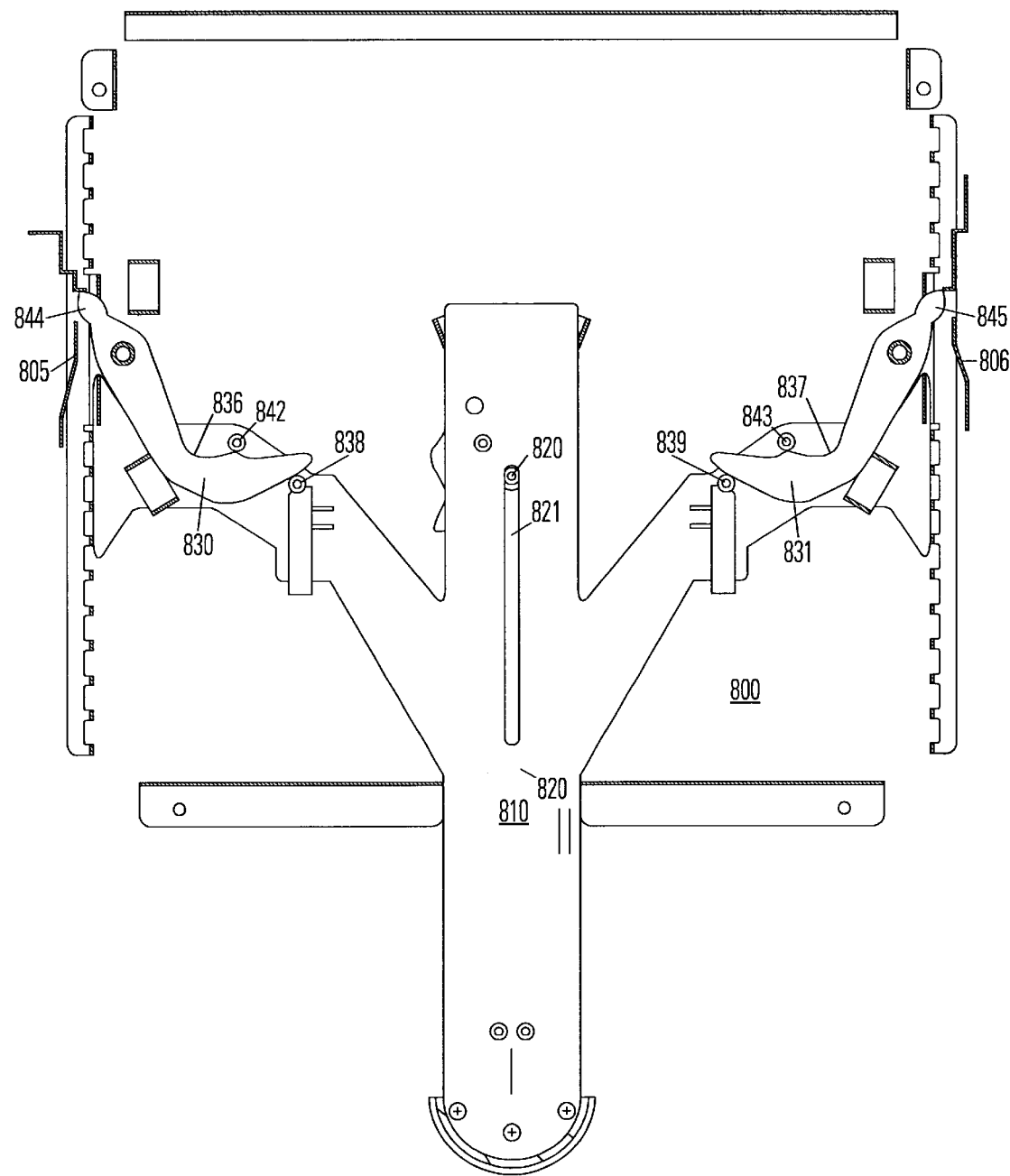
FIG. 11 is a plan view of the embodiment of FIG. 8, the slide being in a fully withdrawn position.

Operation of the lever assembly can be understood with respect to FIGS. 9, 10, and 11, which use the same reference numbers as FIG. 8. As can be seen in FIG. 8, the inside curved surfaces 834, 835 of the lever arms 830, 831 contact outside surfaces of the bars 840 and 841 which are parallel to the direction of motion of the slide. The outside curved surfaces 836 and 837 of the left and right lever arms contact pivots 842 and 843 respectively. The engagement ends 844 and 845 of the lever arms 830 and 831 apply force against the stops 805 and 806, which force tends to hold the mechanism in the chassis.

In FIG. 9, the slide 810 is shown withdrawn to an intermediate position. Between the position of FIG. 8 and the position of FIG. 9, there is no cover movement. The inside surfaces 834 and 835 of the lever arms ride against the bars 840 and 841 until the position indicated in FIG. 9. The engagement ends 844 and 845 continue to apply engagement force against the stops 805 and 806 respectively.

FIG. 10 illustrates a position in which the slide 810 is near a fully withdrawn position. As the slide moves from the position of FIG. 9 to the position of FIG. 10, the inside surfaces of the lever arms 830, 831 rotate about the pivots 838 and 839. The pivots 842 and 843 engage the outside surfaces 836 and 837. As the lever arms move through the position of FIG. 10, they apply leverage to overcome the connector resistance and cause the engagement ends 844 and 845 to apply disengagement force against the stops 805 and 806.

FIG. 11 illustrates the slide 810 in the fully withdrawn position. This position, the riser 820 is against the distal end of the slot 821 on the slide 810. The lever arms 830 and 831 rotate so that the engagement ends 844 and 845 are withdrawn relative to the cover 800, allowing removal of the cover from the chassis without resistance from the stops 805 and 806. The outside curved surfaces 836 and 837 rotate on the pivots 842 and 843 during the final lever transition.

As the component is inserted, the lever system goes through low leverage transition between positions of FIG. 11 and FIG. 10, and begins to apply higher leverage after the position of FIG. 10. In the transition from the position of FIG. 10 to the position of FIG. 9, the lever system overcomes the connector resistance. In the position of FIG. 9, the component is fully engaged. As the slide is inserted from the position of FIG. 9 to the position of FIG. 8, there is no component movement.

In the region of movement of the slide between the inserted position of FIG. 8 and the intermediate position of FIG. 9, there is essentially no movement of the engagement ends 844 and 845 of the lever arms. The detector mechanism described above operates to detect attempted removal of the component in this region of no movement. This allows the electromechanical lock to engage if the system is not prepared for removal of the component, or to allow removal if the system is prepared.

Computer systems incorporating principles of this invention provide several advantages. In particular, the invention provides an assembly that allows for modules engaged with a computer system to be safely and easily hot-swapped. For example, the cover 200, 800 under this system may only be removed when the logic of the computer system confirms that the module is ready to be disengaged from the system. Moreover, the cover 200, 800 may include safeguards that prevent damage to the lock, module, or computer system by users who suddenly apply significant forces to prematurely disengage the module. In addition, the cover may include a leveraged translational mechanism including a combination of levers, retraction arms and engagement members which allow for easy engagement and disengagement of the module from the computer system. In an embodiment of the invention, the translational mechanism may leverage a force applied to a slide 210, 810 of the cover 200, 800 to allow users to easily insert and engage modules requiring significant insertion forces.

Two separate issues with regard to hot swapping modules in computer systems include:

1. Plugging or unplugging cards requires the system bus be "stopped" or noise could cause data or program corruption.

2. Data in the card could be lost if a card were removed without giving the system time to store the data.

To prevent unexpected extraction of a card, a mechanical and electrical lock using a solenoid in one example is used. The solenoid is used to lock the lever mechanism on each board module. The solenoid is energized by the module power supply thus preventing the energized module from being removed. In order to reduce energy consumption a switch on the release latch turns on the solenoid only when moved, i.e., when someone is trying to remove the module. A short pin on the bus connector can be polled to ensure the card release latch. Removal of a card is done using the front panel display management interface or the management interface remotely. The LEDs on the boards not ready to be removed can flash amber while the LED on board that is ready to be extracted is unlit. Note that the bus will continue to operate until a user squeezes the release latch to the card. This operates a switch in the latch that alerts the system the card is being unplugged. Bus activity is suspended.

The embodiments shown are advantageous for reasons including:

1. The solenoid is powered from the onboard DC/DC power supply in the module.

2. Non-operating (de-energized) boards may be removed at any time.

3. A switch on the release latch alerts the system when a board is being unplugged.

4. To save power and reduce heat the solenoid only operates when the release latch is squeezed.

5. No force is applied to the solenoid when the module is locked and a user attempts to remove the module.

6. Only a small force is applied to the solenoid when the system is unlocked. This allows the use of a very small solenoid.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical applications, thereby enabling others skilled in the art to understand the invention for various embodiments and with various modifications as are suited to the particular use contemplated. It is intended that the scope of the invention be defined by the following claims and their equivalents.

What is claimed is:

1. A module for a computer system, the system including a chassis having one or more slots for accepting the module, and processing resources associated with removing and inserting modules during operation of the system, the module comprising:

a cover having a first side and a second side, and adapted to fit within a slot in the chassis;

a component mounted in the cover;

a connector coupled to the component and the first side of the cover, including a plurality of connection elements adapted to mate with corresponding elements in the chassis upon engagement with the system; and means, coupled with the cover and the processing resources, for engaging and disengaging the component with the system, and for preventing disengagement at times signaled by the processing resources.

2. The module of claim 1, wherein the means for engaging and disengaging the component leverages an insertion force applied to the cover to mate the connector with corresponding elements in the chassis.

3. The module of claim 1, wherein the means for engaging and disengaging the component comprises first and second engagement members positioned on opposing sides of the cover, and structure adapted to apply a substantially balanced force to the first and second engagement members.

4. The module of claim 1, including a lock coupled with the means for engaging and disengaging and in communication with the computer system which prevents disengagement of the component absent an enable signal provided by the computer system.

5. A module for a computer system, the system including a chassis having one or more slots for accepting the module, and processing resources associated with removing and inserting modules during operation of the system, the module comprising:

a cover having a first side and a second side, and adapted to fit within a slot in the chassis;

a component mounted in the cover;

a connector coupled to the component and the first side of the cover, including a plurality of connection elements adapted to mate with corresponding elements in the chassis upon engagement with the system; and means, coupled with the cover, for engaging and disengaging the component with the system; wherein the means for engaging and disengaging the component includes:

a slide coupled to the cover to be moveable between an extended position and an inserted position with respect to the cover;

a first lever arm coupled to the slide and extending towards a lateral edge of the cover; and a first engagement member coupled to the first lever arm and positioned with respect to the lateral edge to engage the chassis so as to direct the cover towards the chassis when the slide is moved to the inserted position.

6. The module of claim 5, wherein movement of the slide towards the inserted position directs the first lever arm to apply an insertion force to the engagement member that engages the engagement member with the chassis.

7. The module of claim 5, wherein the component mates with corresponding elements in the chassis upon the first lever arm applying an insertion force to the engagement member that is greater than a translation force applied to the slide in moving the slide towards the inserted position.

8. The module of claim 5, wherein the first engagement member includes a catch end which engages a slot on the chassis as the slide is moved towards the inserted position.

9. The module of claim 5, further comprising:

a fulcrum coupled to the first lever arm, the fulcrum positioned to pivot into the first engagement member when the slide is moved towards the inserted position so as to direct the first engagement member to engage the chassis and to force the first engagement member to push against the chassis.

10. The module of claim 9, therein the component couples with the connector upon the connector being provided with an insertion force greater than a translation force applied to the slide in moving the slide towards the inserted position, and a ratio of the insertion force with respect to the translation force is equal to a ratio of a length of the first lever arm and a distance defined from a pivot of the fulcrum and the lateral edge.

11. The module of claim 10, further comprising a first retraction arm coupled to the slide and to the catch member, the first retraction arm directing the catch member in a lateral direction away from the chassis when the slide is moved towards the extended position and towards the chassis when the slide is moved towards the inserted position.

12. The module of claim 5, further comprising:

a second lever arm coupled to the slide and extending towards a lateral edge of the cover; and a second engagement member coupled to the second lever arm and positioned with respect to the lateral edge to engage the chassis so as to direct the cover into engagement with the chassis when the slide is moved to the inserted position.

13. An assembly for engaging a component to a computer system, the assembly comprising:

a cover adapted to retain the component and to be inserted within a chassis of the computer system;

a slide moveably coupled to the cover between a proximal position associated with inserting the cover into the chassis and a distal position associated with withdrawing the cover from the chassis;

a lock coupled to the slide, the lock blocking movement of the slide towards the distal position when in an engaged state;

a detector coupled to the lock and the slide, the detector detecting movement of the slide to actuate the lock.

14. The assembly of claim 13, further comprising:

logic associated with the computer system to provide a control signal to the lock to selectively actuate the lock when the component is ready for removal.

15. The assembly of claim 14, wherein the detector provides a first signal to actuate the lock, and the logic provides the control signal to selectively override the first signal.

16. The assembly of claim 15, including a mechanism coupled to the slide and to the cover to apply an insertion force against the chassis as the slide is moved to the proximal position.

17. The assembly of claim 14, wherein the detector includes:

a detector surface having a biased distal end that extends over a front segment of the slide that is adjacent to the cover, the distal end of the detector surface having a raised position and a depressed position in which the distal end is biased, wherein a portion of the detector surface is associated with a switch that is coupled to actuate the lock so that the switch actuates the lock when the distal end is moved towards the slide, and wherein the logic selectively overrides the switch when the distal end is depressed.

18. The assembly of claim 14, wherein the detector includes a sensor for determining movement of the slide towards the distal position, and the sensor communicates with the logic to selectively actuate the lock.

19. An assembly according to claim 14, wherein the logic includes resources for receiving a request to remove the component, and resources for determining whether the component is ready for removal from the computer system.

20. An assembly according to claim 14, wherein the logic is coupled to a graphic user interface for receiving a request to remove the component.

21. An assembly according to claim 14, wherein:

the lock comprises a cam and a solenoid;

the detector includes a detector surface having a biased distal end that extends over a front segment of the slide that is adjacent to the cover, the distal end of the detector surface having a raised position and a depressed position in which the distal end is biased, wherein a portion of the detector surface is associated with a switch, the switch being coupled to the logic and coupled to the solenoid to actuate the solenoid when the distal end is moved towards the slide, and wherein the solenoid is actuated upon the switch being closed by the detector surface and the switch receiving an engagement signal from the logic.

22. The assembly of claim 13, wherein the slide is moveable for a distance which is a portion of the length between the distal and proximal position prior to the lock blocking further movement of the slide towards the distal position.

23. The assembly of claim 13, wherein the detector includes:

a detector surface having a biased distal end that extends over a front segment of the slide that is adjacent to the cover, the distal end of the detector surface having a raised position and a depressed position in which the distal end is biased, wherein a portion of the detector surface is associated with a switch that is coupled to actuate the lock so that the switch actuates the lock when the distal end is moved towards the slide.

24. The assembly of claim 13, wherein the detector includes:
- a detector surface having a biased distal end that extends over a front segment of the slide that is adjacent to the cover, the distal end of the detector surface having a raised position and a depressed position in which the distal end is biased,
- wherein a medial surface of the detector surface obstructs against the chassis to prevent movement of the slide towards the extended position when the lock is in the engaged state and when the distal end is in the raised position.

25. The assembly of claim 13, wherein the lock comprises a cam and a solenoid.

26. The assembly of claim 13, wherein the lock comprises:
- a solenoid secured to the cover at a first end, and proximal to the slide at a second end, the solenoid being moveable between a retracted position and an extended position with respect to the slide; and
- a cam secured to the slide and moveable between a locked position for arresting movement of the slide towards the distal position and an unlocked position, the cam adapted to engage the solenoid and move into the unlocked position when the solenoid is in the extended position.

27. An assembly according to claim 26, wherein the cam is pivotable along a plane that is substantially parallel to the slide, the cam being pivotable between an extended position corresponding to the locked position and a retracted position corresponding to the unlocked position.

28. An assembly for engaging a component to a computer system, the assembly comprising:
- a cover having a front end and a back end, the cover adapted to retain the component and to be inserted within the computer system to couple the component to a connector associated with the computer system;
- a slide coupled to the cover to be moveable between an extended position and an inserted position with respect to the cover;
- a first lever arm coupled to the slide and extending towards a lateral edge of the cover;
- a first engagement member coupled to the first lever arm and positioned with respect to the lateral edge to engage the computer system so as to direct the cover towards the connector when the slide is moved to the inserted position;
- a lock coupled to the slide to prevent movement of the slide when the lock is engaged with the slide; and
- a detector coupled to the lock and the slide, the detector detecting movement of the slide to actuate the lock.

29. The assembly of claim 28, further comprising:
- logic associated with the computer system and coupled to the lock to selectively override the detector in actuating the lock.

30. The assembly of claim 29, wherein the detector includes:
- a detector surface having a biased distal end that extends over a front segment of the slide that is adjacent to the cover, the distal end of the detector surface having a raised position and a depressed position in which the distal end is biased;
- wherein a portion of the detector surface is associated with a switch that is coupled to actuate the lock so that the switch actuates the lock when the distal end is moved towards the slide and wherein the logic selectively overrides the switch when the detector is depressed.

31. The assembly of claim 29, wherein the detector includes a sensor for determining movement of the slide towards the extended position, and the sensor communicates with the logic to selectively actuate the lock.

32. An assembly according to claim 29, wherein the logic includes resources for receiving a request to remove the component, and resources for determining whether the component is ready for removal from the computer system.

33. An assembly according to claim 32, wherein the logic is coupled to a graphic user interface for receiving a request to remove the component.

34. The assembly of claim 28, wherein movement of the slide towards the inserted position directs the first lever arm to apply an insertion force to the engagement member that engages the engagement member with the computer system.

35. The assembly of claim 28, wherein the component couples with the connector upon the first lever arm applying an insertion force to the engagement member that is greater than a translation force applied to the slide in moving the slide towards the inserted position.

36. The assembly of claim 28, wherein the slide moves from the inserted position over a portion of a length defined between the inserted and extended position before the detector actuates the lock.

37. The assembly of claim 28, wherein the first engagement member includes a catch end which engages a slot of the computer system as the slide is moved towards the inserted position.

38. The assembly of claim 37, further comprising:
- a fulcrum coupled to the first lever arm, the fulcrum positioned to pivot into the first engagement member when the slide is moved towards the inserted position so as to direct the catch end to engage the slot and to force the catch end to push against a chassis wall defining the slot.

39. The assembly of claim 38, wherein the component couples with the connector upon the connector being provided with an insertion force greater than a translation force applied to the slide in moving the slide towards the inserted position, and a ratio of the insertion force with respect to the translation force is equal to a ratio of a length of the first lever arm and a distance defined between a pivot of the fulcrum and the lateral edge.

40. The assembly of claim 39, further comprising:
- a first retraction arm coupled to the slide and to the catch end, the first retraction arm directing the catch member in a lateral direction away from the computer system when the slide is moved towards the extended position and towards the computer system when the slide is moved towards the inserted position.

41. The assembly of claim 28, further comprising:
- a second lever arm coupled to the slide and extending towards a lateral edge of the cover; and
- a second engagement member coupled to the second lever arm and positioned with respect to the lateral edge to engage the computer system so as to direct the cover into engagement with the computer system when the slide is moved to the inserted position.

42. The assembly of claim 28, wherein the detector includes:
- a detector surface having a biased distal end that extends over a front segment of the slide that is adjacent to the cover, the distal end of the detector surface having a raised position and a depressed position in which the distal end is biased;

wherein a portion of the detector surface is associated with a switch that is coupled to actuate the lock so that the switch actuates the lock when the distal end is moved towards the slide.

43. The assembly of claim 28, wherein the detector includes:

a detector surface having a biased distal end that extends over a front segment of the slide that is adjacent to the cover, the distal end of the detector surface having a raised position and a depressed position in which the distal end is biased, wherein a medial surface of the detector surface obstructs against the chassis to prevent movement of the slide towards the extended position when the lock is in the engaged state and when the distal end is in the raised position.

44. The assembly of claim 28, wherein the lock comprises a cam and a solenoid.

45. An assembly according to claim 44, wherein:

the detector includes a detector surface having a biased distal end that extends over a front segment of the slide that is adjacent to the cover, the distal end of the detector surface having a raised position and a depressed position in which the distal end is biased, wherein a portion of the detector surface is associated with a switch, the switch being coupled to actuate the solenoid when the distal end is moved towards the slide, and wherein the solenoid is actuated upon the switch being closed by the detector surface and the switch receiving an engagement signal.

46. The assembly of claim 28, wherein the lock comprises:

a solenoid secured to the cover at a first end, and proximal to the slide at a second end, the solenoid being moveable between a retracted position and an extended position with respect to the slide; and a cam secured to the slide and moveable between an unlocked position and a locked position for arresting movement of the slide towards the extended position, the cam adapted to engage the solenoid to move into the locked position when the solenoid is in the extended position.

47. An assembly according to claim 46, wherein the cam is pivotable along a plane that is substantially parallel to the slide, the cam being pivotable between an extended position corresponding to the locked position and a retracted position corresponding to the unlocked position.

48. An assembly for engaging a component to a chassis of a computer system, the assembly comprising:

a cover adapted to retain the component and to be inserted within the chassis to couple the component to a connector associated with the computer system;

a lock coupled to the cover to prevent removal of the cover from the computer chassis when the lock is engaged; and logic associated with the computer system to determine whether the component is ready to be disengaged from the computer system, the logic being coupled to the lock to selectively engage or disengage the lock when the computer system is operational.

49. The assembly of claim 48, further comprising a detector coupled to the lock for detecting a removal force applied to the cover.

50. The assembly of claim 48, further comprising a mechanism coupled to the cover to apply an insertion force against the chassis when the cover is inserted into the chassis.

51. A module of a computer system, the system including a chassis having one or more slots for accepting the module, and processing resources associated with removing and inserting modules during operation, the module comprising:

a cover having a first side and a second side, and adapted to fit within a slot in the chassis;

a component mounted in the cover;

a connector coupled to the component and the first side of the cover, including a plurality of connection elements adapted to mate with corresponding elements in the chassis upon engagement of the component with the system;

a slide, coupled with the cover, having a first end extending from the second side of the cover and a second end between the first and second sides of the cover and moveable among an inserted position, an intermediate position and an extended position;

a translation mechanism to translate movement of the slide from the intermediate position to the extended position into force causing disengagement of said connector, and to translate movement of the slide from the extended position to the intermediate position into force for engagement of said connector;

a detector coupled with the slide which detects movement of the slide between the inserted position and the intermediate position;

a lock coupled with the cover and the slide, having a locked state preventing movement of the slide past the intermediate position and an unlocked state allowing movement to the extended position; and logic coupled with the processing resources and the detector, which causes the lock to enter the locked state upon detection of motion between the inserted and intermediate position, and which causes the lock to enter the unlocked state upon receipt of a signal from the processing resources.

52. The module of claim 51, wherein the translation mechanism includes a lever which engages upon movement of the slide between the intermediate position and the inserted position.

53. The module of claim 51, wherein the lock assumes the unlocked state when power is off.

54. The module of claim 51, wherein the translational mechanism includes a first lever arm coupled to the slide and extending towards a lateral edge of the cover, and wherein movement of the slide towards the inserted position directs the first lever arm to apply an insertion force to the connector.

55. The module of claim 54, wherein the translational mechanism includes an engagement member having a catch end that engages a slot of the chassis as the slide is moved towards the inserted position.

56. The module of claim 55, wherein the translational mechanism includes:

a fulcrum coupled to the first lever arm, the fulcrum positioned to pivot into an engagement member when the slide is moved towards the inserted position so as to direct the catch member to engage the slot and to force the catch member to push against a chassis wall defining the slot.

57. The module of claim 56, wherein the connector mates with corresponding elements in the chassis upon the connector being provided with an insertion force greater than a translation force applied to the slide in moving the slide towards the inserted position, and a ratio of the insertion force with respect to the translation force is equal to a ratio of a length of the first lever arm and a distance defined between a pivot of the fulcrum and the lateral edge.

58. The module of claim 56, wherein the translational mechanism includes:

a first retraction arm coupled to the slide and to the catch member, the first retraction arm directing the catch member in a lateral direction away from the chassis when the slide is moved towards the extended position and towards the chassis when the slide is moved towards the inserted position.

59. The module of claim 56, wherein the translational mechanism includes:

a second lever arm coupled to the slide and extending towards a lateral edge of the cover; and a second engagement member coupled to the second lever arm and positioned with respect to the lateral edge to engage the chassis so as to direct the cover into engagement with the chassis when the slide is moved to the inserted position.

60. The module of claim 51, wherein the detector includes:

a detector surface having a biased distal end that extends over the front end of the slide, the distal end of the detector surface having a raised position and a depressed position in which the distal end is biased;

wherein a portion of the detector surface is associated with a switch that is coupled to actuate the lock so that the switch actuates the lock when the distal end is moved towards the slide.

61. The assembly of claim 51, wherein the detector includes:

a detector surface having a biased distal end that extends over a front segment of the slide that is adjacent to the cover, the distal end of the detector surface having a raised position and a depressed position in which the distal end is biased;

wherein a portion of the detector surface is associated with a switch that is coupled to actuate the lock so that the switch actuates the lock when the distal end is moved towards the slide and wherein the logic selectively override the switch when the detector is depressed.

62. The assembly of claim 51, wherein the detector includes:

a detector surface having a biased distal end that extends over a front segment of the slide that is adjacent to the cover, the distal end of the detector surface having a raised position and a depressed position in which the distal end is biased, wherein a medial surface of the detector surface obstructs against the chassis to prevent movement of the slide towards the extended position when the lock is in the engaged state and when the distal end is in the raised position.

63. The assembly of claim 51, wherein the lock comprises a cam and a solenoid.

64. The assembly of claim 51, wherein the lock comprises:

a solenoid secured to the cover at a first end, and proximal to the slide at a second end, the solenoid being moveable between a retracted position and an extended position with respect to the slide; and a cam secured to the slide and moveable between an unlocked position and a locked position for arresting movement of the slide towards the extended position, the cam adapted to engage the solenoid to move into the locked position when the solenoid is in the extended position.

65. An assembly according to claim 64, wherein the cam is pivotable along a plane that is substantially parallel to the slide, the cam being pivotable between an extended position corresponding to the locked position and a retracted position corresponding to the unlocked position.

66. An assembly according to claim 65, wherein:

the detector includes a detector surface having a biased distal end that extends over a front segment of the slide that is adjacent to the cover, the distal end of the detector surface having a raised position and a depressed position in which the distal end is biased, wherein a portion of the detector surface is associated with a switch, the switch being coupled to the logic and coupled to actuate the solenoid when the distal end is moved towards the slide, and wherein the solenoid is actuated upon the switch being closed by the detector surface and the switch receiving an engagement signal from the logic.

67. An assembly according to claim 51, wherein the logic is coupled to a graphic user interface for receiving a request to remove the component.

* * * * *